May 23, 1939.  J. D. WEST  2,159,610
ELECTROMAGNETIC CONTROL DEVICE
Filed Aug. 20, 1937
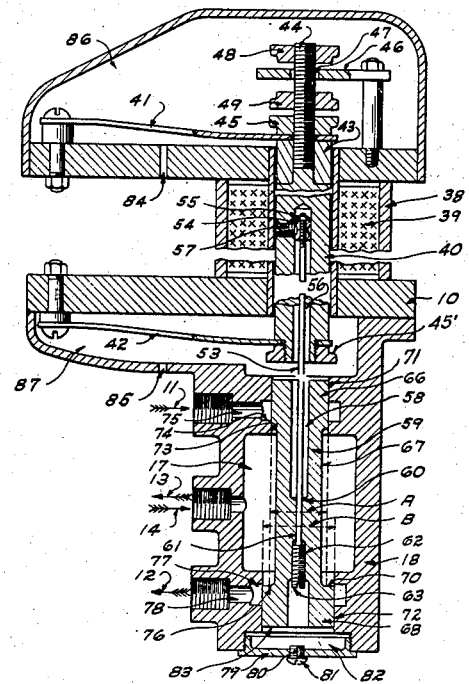
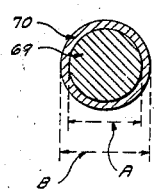
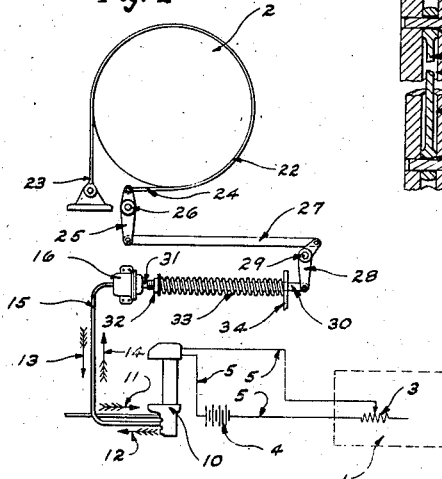
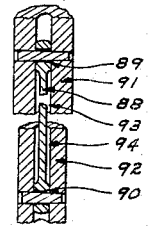
INVENTOR.
JOHN D. WEST
BY
Arthur R. Woolfolk
ATTORNEY.

Patented May 23, 1939

2,159,610

UNITED STATES PATENT OFFICE 2,159,610

ELECTROMAGNETIC CONTROL DEVICE

John D. West, Manitowoc, Wis., assignor to Manitowoc Shipbuilding Corporation, Manitowoc, Wis.

Application August 20, 1937, Serial No. 160,108

6 Claims. (Cl. 137—139)

This invention relates to an electromagnetic control device.

Objects of this invention are to provide a device which is adapted for remote control and which is so constructed that it maintains any selected pressure in a fluid pressure operated motor, such, for example, as a brake cylinder, the invention providing means whereby an operator remote from the device may set a rheostat or other controller at a selected point and an electromagnetic valve will maintain a certain pressure in a brake cylinder or other device corresponding to the setting of the controller or rheostat, whereby the remote operator may accurately govern or control the pressure in the brake cylinder or other device with assurance that the apparatus will automatically maintain the pressure selected by the operator from his remote point without any further thought on the part of the operator, and whereby the operator may vary this pressure, either decreasing it or raising it as desired, the invention, however, in its broadest aspects not being limited to the control from a remote point but comprehending the automatic electromagnetic valve interposed between the operator and the device actuated by fluid pressure.

In greater detail, objects of this invention are to provide electromagnetically controlled means for maintaining a definite pressure in a piston or other pressure operated device, such, for example, as a brake cylinder, whereby the setting of a rheostat or other control member determines the amount of pressure maintained temporarily in such cylinder or other pressure operated device, and to provide electromagnetic means which control a floating valve movable to admit or exhaust fluid pressure to and from a cylinder or other device and to cut off communication with such cylinder or other device, and to provide means for unbalancing the valve whereby the force exerted by the valve is balanced against the force exerted by the electromagnetic device so that the valve floats approximately at its neutral or cut-off position whereby if a leak should occur in the pressure system connected with the cylinder, the valve will automatically restore the pressure and when the pressure arrives at the desired point for which the electromagnetic device is set, the valve will automatically cut off further pressure fluid flow to the cylinder and reversely whereby if the pressure should for any reason increase, the valve will automatically allow the escape of pressure fluid from the cylinder until the exact pressure for which the electromagnetic device has been set is reached in the cylinder.

Further objects are to provide an electromagnetic device which is mechanically connected to a differential pressure controlling floating valve having a neutral cut-off position and having extreme positions on opposite sides thereof for admission and exhaust of pressure fluid to a pressure responsive device, such as a brake cylinder, for instance, and to so construct the apparatus that the electromagnetic device may have its pull or force controlled from a remote point, as by means of a controller or rheostat so that the operator may from the remote point precisely determine the pressure that will exist in the cylinder, the device automatically maintaining this pressure without any further thought on the part of the operator.

Further objects are to provide a very simple construction although having the automatic features hereinabove enumerated, the invention specifically having for its object the provision of an electromagnetically operated valve that floats about its neutral position and accurately balances the magnetic pull of the valve against the fluid pressure so that an automatic adjustment is constantly maintained between the magnetic pull and the fluid pressure, the device immediately adjusting itself in an automatic manner to compensate for variations in either the magnetic pull as determined by the operator or the fluid pressure, which might vary from any of several causes.

An embodiment of the invention is shown in the accompanying drawing, in which:

Figure 1 is a sectional elevation of the automatic valve, with parts broken away.

Figure 2 is a diagrammatic view of the valve in its association with a brake and a remote controller or rheostat.

Figure 3 is a transverse view showing the relative areas of the two portions of the differential valve.

Figure 4 is a fragmentary view showing a modified construction.

Referring to the drawing, particularly Figure 2, 1 indicates a control board having a rheostat or controller 3 thereon. 2 is a brake drum whose operation it is desired to control from the controller, the controller it being understood being located at a remote point or else adjacent the apparatus, the device readily lending itself to remote control.

The controller 3 is connected by means of the circuit 5 with the automatic valve 10, a suitable source of power, such as a battery 4, being provided, though it is to be distinctly understood that any other suitable source of power, such as electric mains for instance, could be used.

The automatic valve is supplied with fluid pressure, the direction of flow being indicated by the arrow 11, the exhaust by the arrow 12, and the arrows 13 and 14 indicating the flow either from or to the brake cylinder 16 by way of the pipe 15. In the form chosen for illustration, the brake cylinder 16 is so arranged that it relieves the pressure of the brake band 22 on the drum 2 when pressure fluid is admitted to the brake cylinder, the spring 33 applying the brake, such spring being coiled loosely about the rod 30 and bearing at one end against a fixed stop 34 and at the other end against a stop or shoulder 32 adjustably carried by the rod 30. The rod 30 is attached to the piston rod 31 so that as the piston rod moves to the right in Figure 2, it compresses the spring, rocks the bell crank lever 28 in a counter-clockwise direction, and rocks the brake band lever 25 in a clockwise direction through the medium of the connecting link 27, the levers 25 and 28 being respectively pivoted as indicated at 26 and 29. The brake band 22 has a portion thereof spaced from the drum 2, as indicated at 24, and attached to the brake lever 25. The other end of the brake band is indicated by the reference character 23 and is attached to a fixed support.

Referring to both Figures 1 and 2, it will be seen, as shown in Figure 1, that the pipe 15 leading to the brake cylinder communicates with the annular cavity 17 in the body of the valve, such body being indicated by the reference character 18 in Figure 1.

The movable portion of the valve, which constitutes the valve proper, is indicated by the reference character 59. It is controlled by means of a magnet which may take the form of a solenoid and which has a plunger 40 mechanically and adjustably connected with the valve 59 by means of the flexible wire or flexible rod 53, the details of the connection being hereinafter described.

The magnet chosen for illustration consists, as stated, of the solenoid type and the solenoid or winding is indicated by the reference character 39 and is housed within a casing or shell 38. The plunger or armature of the magnet is carried by the upper and lower springs 41 and 42 which are clamped to the plunger by means of the upper and lower clamping nuts 45 and 45'. The core of the magnet does not have extensive motion and the springs will keep it from touching or dragging against the adjacent portion of the magnet structure.

The stroke of the plunger may be limited if desired by providing upper and lower limit nuts 48 and 49 adjustably carried by the threaded stem 44 extending upwardly from the core and passing through the aperture 47 of a fixed stop 46. It is to be noted that the lower clamping nut 45' screws upon a reduced extension of the plunger 40, whereas the upper clamping nut 45 is screwed upon the threaded stem 44 of the core and clamps the spring 41 against a spacing sleeve 43 carried by the core 40. If desired, this spacing sleeve 43 may be made of non-magnetic material, whereas, of course, the core is made of magnetic material, thus causing the core when the magnet is energized to have a tendency to rise. The springs 41 and 42 are respectively housed in their casings 86 and 87 and downwardly opening vents 84 and 85 are provided.

The differential valve has a relatively small upper head 66 and a relatively larger lower head 68 and a reduced intermediate or waist portion 67. It is provided with a bore 58 that extends down to approximately its center of gravity which is approximately located at the point indicated by the reference character 60.

The enlarged lower head 68 has a cut off shoulder 76 which cuts off from the exhaust passage 78 and which constitutes the lower cut off shoulder of the differential valve. The upper head 66 has a cut off shoulder 73 for cutting off communication with the pressure fluid inlet 75, and constitutes the upper cut off shoulder of the differential valve. The passages 75 and 78 communicate respectively with an annular pressure inlet port 74 and an annular exhaust port 77.

The area of the upper head 66 is indicated in Figure 3 by the reference character 69 and its diameter by the reference character A in Figures 1 and 3. The difference in area between the lower and upper heads 68 and 66 is indicated in Figure 3 by the reference character 70 and the diameter of the lower head 68 is indicated in Figures 1 and 3 by the reference character B.

The differential valve, therefore, has a tendency to move downwardly to cut off the pressure fluid and to open the exhaust. The pull of the solenoid is upwardly and is balanced against the downward force exerted by the differential valve. The detailed operation of this device will appear hereinafter.

The flexible wire or flexible rod 53 allows the differential valve 59 to operate smoothly within the upper bore 71 and the lower bore 72 without any tendency to bind, although there may be a difference in alignment between such valve and the plunger 40 of the solenoid. This flexible wire 53 has an enlarged threaded lower portion 63 which screws into the threaded aperture 62 of the valve. The valve is provided with a relatively smaller aperture 61 through which the wire 53 passes, emerging from this aperture at the point 60, namely, at approximately the center of gravity of the valve. The upper portion of the flexible wire 53 extends through the opening 56 in the core 40 of the solenoid and its upper end is threaded and screws into a small nut 54, a lock nut 55 being provided. The nut 54 is clamped in place in the plunger by means of the set screw 57. It is thus readily possible to adjust the relative positions of the solenoid plunger 40 and the differential valve 59.

A dash pot effect is provided by providing the cavity 82 in a bottom cap 79 screwed into the bottom of the valve so that as the valve moves downwardly, air is compressed beneath the lower face 83 of the valve. It escapes through the restricted passage 80 formed in the adjustable screw 81 which is screwed into the bottom of the cap 79. This prevents any shock from the operation of the valve and acts to prevent even instantaneous over shooting of the valve.

It is obvious that a rigid rod can be used in place of the flexible wire 53, provided suitable articulation is afforded at its upper and lower ends. For example, as shown in the modified form of Figure 4, a rigid rod 88 connects the magnet plunger and the differential valve, a fragment of each being respectively indicated by the reference characters 91 and 92. One way in which the ends of the rod 88 may be joined to the respective portions of the device is by providing upper and lower pins in the magnet core 91 and in the valve 92 which pass through apertures 89 and 90 formed in the ends of the rigid rod 88. As indicated in Figure 4, these apertures may have transversely rounded surfaces to allow rocking in two directions at right angles to each other, to thus provide the requisite freedom at the ends of the rigid rod 88, suitable apertures 93 and 94 being provided in the plunger 91 and in the valve 92.

The operation of the apparatus is as follows: The operator sets the rheostat or controller at the desired point and a certain definite force or pull is exerted by the solenoid. This moves the differential valve upwardly and allows fluid pressure to pass into the valve casing and into the brake cylinder until a pressure is built up within the brake cylinder and within the valve casing such that the pull on the differential valve opposes the pull of the solenoid sufficiently to move the valve downwardly, as viewed in Figure 1, to cut-off position. This action is wholly automatic.

If a leak should occur and the pressure should fall, the valve will again adjust itself automatically so as to allow the pressure to be built up until the predetermined desired pressure for which the device is then set is obtained. This action is wholly automatic and takes place without any thought on the part of the operator.

If the operator should readjust the controller or rheostat for another pressure, the same action will take place, the valve moving until the desired pressure is reached and thereafter moving back automatically to cut-off position. This action occurs either for increasing or decreasing the pressure.

In the event it is wished to decrease the pressure in the brake cylinder, the operator merely sets the controller to allow less pull to be exerted by the solenoid and consequently the differential valve overcomes the pull of the solenoid and moves to exhaust position until the desired pressure is reached. Thereafter the solenoid just balances the pull of the valve and the valve floats and moves back to cut-off or neutral position, where it stays unless a leak occurs. As described hereinabove, if a leak does occur, the valve automatically adjusts itself to compensate for the leak until the desired pressure is again arrived at. This action is automatic.

It will be seen, therefore, that an electromagnetically controlled differential valve has been provided which is so made that the valve may be controlled from a remote point and when the operator sets the controller at the desired point, the valve automatically maintains this pressure and floats at its neutral or cut-off position. Thus a floating electromagnetic valve has been provided which may be set from a remote point if desired at any pressure wished for and which is thereafter wholly automatic in its action in maintaining this pressure.

It is to be noted that the solenoid does not work against a spring and therefore does not balance its pull against a spring, but balances its pull against the desired fluid pressure within the cavity 17. Further it is to be noted that the valve is not dependent upon the position of the apparatus controlled by the valve, that is to say, the valve is not dependent upon the position of the brake solenoid plunger 31, but is dependent solely upon the balancing of the pull of the solenoid against the actual pressure existing within the cavity 17 within the valve casing, which is the same pressure as that existing in the brake cylinder 16.

While the valve is described as a differential valve in which there is an over balancing of pressure in one direction, it is to be distinctly understood that other types of valves may be employed without departing from the spirit of this invention. Further it has been found that by forming the valve in the manner indicated and connecting it with the plunger of the solenoid in the flexible way as described, the valve may be operated without lubrication if desired.

Further it is to be noted that the dash pot chamber 82 is located on the other side of the exhaust port from the chamber 17. Thus if any pressure fluid tends to leak, it will not pass into the dash pot but will arrive at the exhaust port 77 first and consequently unwanted building up of pressure due to leaking of the valve, even after long service, is prevented.

The apertures 84 and 85 in the upper and lower casings above and below the plunger of the solenoid may be made adjustable, as shown at 80 and 81, for the dash pot construction. In this way it is possible to utilize the casings as dash pot chambers. However, it is usually preferred to make the openings 84 and 85 of such size that there is no retardation due to these portions of the apparatus.

It will be seen that a novel form of electrically controlled valve has been provided in which there is a precise balancing between the pressure furnished the motive member, such as the brake unit for instance, and the pull of the solenoid thereby securing the automatic adjustment of the valve to secure and maintain the desired pressure for which the operator has temporarily set the controller.

It will be seen further that the pull of the solenoid is balanced against a force exactly proportional to and caused by the fluid pressure; that if leaks occur, the valve will automatically adjust itself to maintain the pressure at the desired point; and that this point at which the pressure is maintained may be controlled from a remote point or from an adjacent point by adjusting the controller.

Further it will be seen that the construction is such that if for any reason the electric line connecting the controller with the valve should be broken, nevertheless the valve will automatically exhaust and allow the brake to close, thus affording maximum safety.

It is to be noted further that no adjustment of spring tension or other types of adjustments of this general order are required for the valve, but that the valve automatically adjusts itself, as hereinabove described.

While an electromagnet has been shown as the means for exerting a variable force on the differential valve, it is obvious that other means could be employed, provided such means could exert a variable force which is exactly balanced by the pull of the valve. Also different forms of electromagnets could be employed, one form having been chosen for the purpose of illustration. Therefore, although this invention has been described in considerable detail, it is to be understood that such description is intended as illustrative rather than limiting, as the invention may be variously embodied and is to be interpreted as claimed.

I claim:

1. An electromagnetically controlled differential valve comprising a casing having a chamber provided with a delivery opening and having fluid pressure inlet and outlet ports adapted to be selectively placed in communication with said chamber, an unbalanced differential valve controlling said ports and biased by the fluid pressure within said chamber towards exhaust position with the inlet port closed and the outlet port open and having a neutral position closing both ports, said differential valve occupying said neutral position under both active and inactive conditions, and electromagnetic means urging said unbalanced differential valve in a direction in opposition to that towards which said valve is biased by the fluid pressure in said chamber.

2. An electromagnetic valve for controlling fluid pressure comprising a valve body portion having an inlet port and an exhaust port and having a chamber adapted to be placed in communication with said inlet port or exhaust port, said valve including a movable valve member normally occupying a neutral position with both the inlet port and the exhaust port closed, fluid pressure displacing means for displacing said valve member by fluid pressure within said chamber to open said exhaust port and maintain said inlet port closed, and electromagnetic displacing means for displacing said valve to open said inlet port and maintain said exhaust port closed, said fluid pressure and electromagnetic displacing means acting in opposite directions.

3. A differential electromagnetically controlled fluid pressure valve comprising a valve body portion having a chamber provided with a delivery opening and having an exhaust port and an inlet port, said valve including a differential piston normally occupying a neutral position with both ports closed and adapted to slide in opposite directions to open the exhaust port and hold the inlet port closed, or to open the inlet port and hold the exhaust port closed to thereby selectively connect said chamber with either said exhaust port or said inlet port, said differential piston being acted upon by the fluid pressure within said chamber and tending to open the exhaust port when fluid pressure exists within said chamber, and electromagnetic means urging said differential piston in the opposite direction from that due to fluid pressure within said chamber.

4. An electromagnetic fluid pressure valve comprising a valve body having an intermediate chamber provided with a delivery opening and having an exhaust port and an inlet port on opposite sides of and adapted to be selectively connected with said intermediate chamber, said valve comprising a differential piston, the larger part of which controls the exhaust port and the smaller part of which controls the inlet port, said valve having a normal neutral position with both the exhaust port and the inlet port closed, and electromagnetic means tending to move the valve towards open position of the inlet port, whereby when said electromagnetic means is energized and fluid pressure supplied at the inlet port, said valve will float about its neutral position with the force due to the fluid pressure acting on the differential piston balanced against the force due to the action of the electromagnetic means.

5. An electromagnetic fluid pressure valve comprising a valve body having an intermediate chamber provided with a delivery opening and having an exhaust port and an inlet port adapted to be selectively connected with said intermediate chamber, said valve comprising a differential piston, the larger part of which controls the exhaust port and the smaller part of which controls the inlet port, said valve having a normal neutral position with both the exhaust port and the inlet port closed, and electromagnetic means tending to move the valve towards open position of the inlet port, whereby when said electromagnetic means is energized and fluid pressure supplied at the inlet port, said valve will float about its neutral position with the force due to the fluid pressure acting on the differential piston balanced against the force due to the action of the electromagnetic means, said piston when in neutral position under operating conditions being acted upon solely by the fluid pressure and the force exerted by said electromagnetic means.

6. An electromagnetic valve for controlling fluid pressure comprising a valve body portion having an inlet port and an exhaust port and having a chamber adapted to be placed in communication with said inlet port or exhaust port, said valve including a movable valve member normally occupying a neutral position with both the inlet port and the exhaust port closed, fluid pressure displacing means for displacing said valve member by fluid pressure within said chamber to open said exhaust port and maintain said inlet port closed, and electromagnetic displacing means for displacing said valve to open said inlet port and maintain said exhaust port closed, said fluid pressure and electromagnetic displacing means acting in opposite directions, said electromagnetic displacing means including a solenoid and a plunger, said plunger being operatively connected to said movable valve member by means allowing said movable valve member to align itself with said body portion independently of said plunger.

JOHN D. WEST.